Aug. 24, 1943.                H. J. MATTESON                 2,327,542
                         REFRIGERANT CONTROL VALVE
                            Filed June 2, 1941
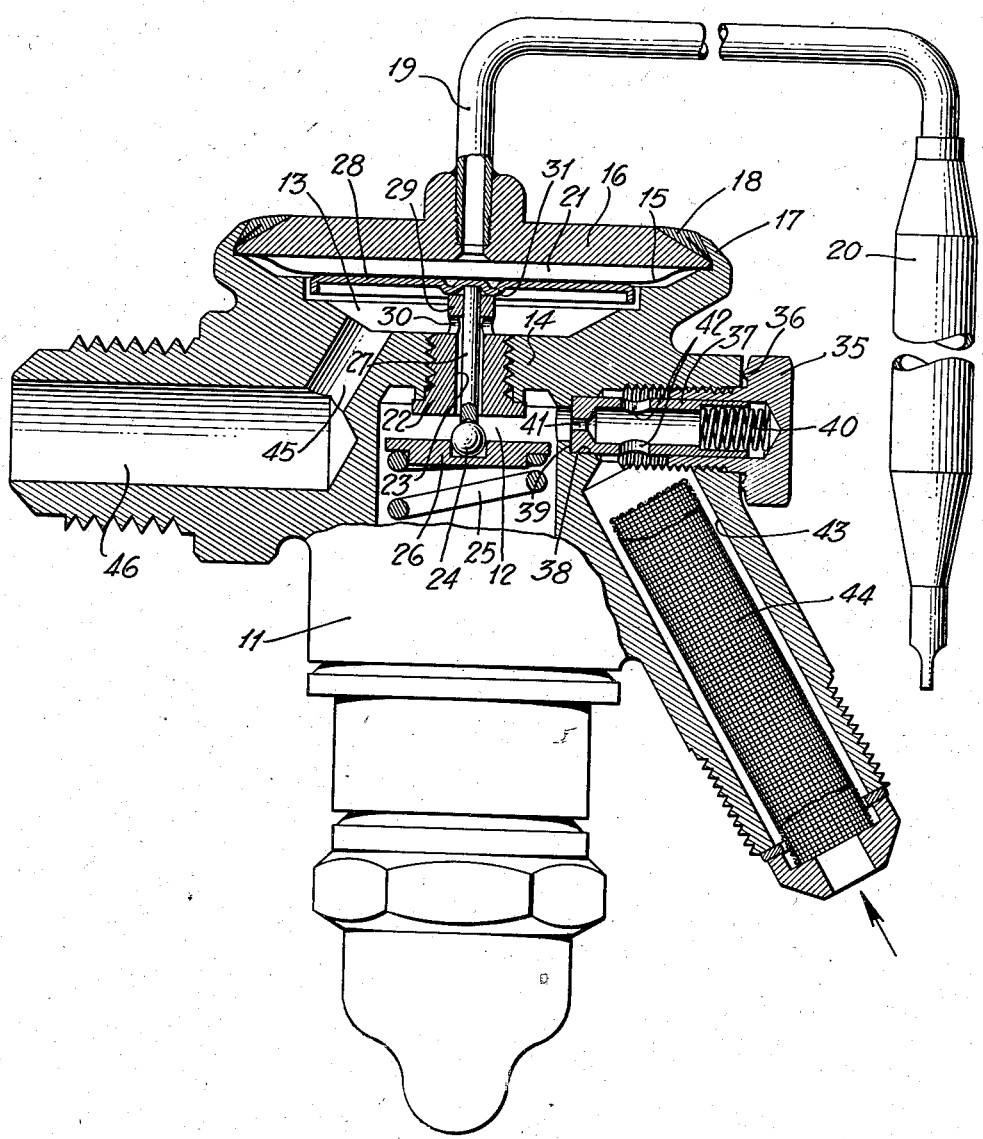
Inventor:
HAROLD J. MATTESON.
By
John H. Roase,
Attorney.

Patented Aug. 24, 1943

2,327,542

UNITED STATES PATENT OFFICE 2,327,542

REFRIGERANT CONTROL VALVE

Harold J. Matteson, Glendale, Calif., assignor to General Controls Co., Glendale, Calif., a corporation of California Application June 2, 1941, Serial No. 396,321

1 Claim. (Cl. 138—44)

My present invention relates generally to fluid control valves and more particularly to those of the type commonly employed for the control of refrigerants.

A main object of my invention is the provision of a flow restricting member which is removably insertable in the fluid passage of a valve, where it is held in operating position solely by the pressure of the controlled fluid, or by means yieldably urging it to that position, so that it is readily removable from the valve casing for the substitution of a similar member having a different flow restricting value.

The invention, while not so limited, has particular utility in a refrigerant control system wherein there must be a definite relation between the flow capacity of the valve and that of the system, which relation cannot always be determined before the system is put into operation, with the result that it is often necessary to disconnect the valve from the system in order to change its orifice or flow restricting member. It is therefore a particular object of my invention to provide means for changing the flow restricting member without disconnecting the valve.

Another object is to provide a flow restricting or orifice member which is insertable in a bore branched from the main fluid passage of the valve, the outer end of the bore being closed by a readily removable cap.

Another object is to provide an orifice member of the type indicated in the preceding object which is in the form of a simple hollow cylinder which is very economical to manufacture, so that several of these members, having orifices of different sizes, may be furnished with each valve without materially adding to the cost.

Other objects and advantages of my invention will be found in the description, the drawing, and the appended claim.

For complete understanding of the invention, reference may be had to the following detailed description and accompanying drawing, wherein the single figure is a view, mainly in section, of a thermostatically controlled expansion valve embodying my invention.

In the drawing, the numeral 11 indicates a valve casing having an inlet 12 and an outlet 13 separated by a partition 14. Closing the upper end of the casing is a flexible metallic diaphragm 15 and a cylindrical diaphragm cover 16. The portion of the casing which extends above this cover is rolled-over as indicated at 17 to securely hold the diaphragm and its cover, the annular space between the cover and the rolled-over portion of the casing being filled with solder 18. Threaded and soldered in a central opening in the cover is the stem 19 of a thermal bulb 20 which contains a volatile fluid. The pressure of this fluid is applied to a chamber 21 defined by the diaphragm and the underside of the cover, which pressure tends to force the diaphragm downward upon increase of bulb temperature. The parts are shown in the drawing in the positions reached when the bulb is at atmospheric temperature and the difference in pressure between chambers 21 and 13 is in excess of normal.

Threaded in an opening in the partition 14 is a member 22 having a valve port opening 23. Cooperable with the lower end of the port, to control fluid flow through the valve, is a ball 24 which is urged toward closed position by a compression spring 25, a disk 26, having a central recess for receiving the ball, being interposed between the spring and the ball. The upper portion of the port 23 is reduced in diameter to serve as a guide for a rod 27 which transmits movement of the diaphragm 15 to the valve ball 24, the rod extending between the ball and the underside of a pusher-plate 28 provided below the diaphragm.

The reduced portion 29 of port member 22 which extends above the partition 14 is provided with lateral openings 30 communicating with the upper unreduced portion of the port. The pusher-plate 28 is depressed toward its center to provide an annular portion 31 which surrounds the upper end of rod 27 and thus limits lateral movement of the push-plate. The portion 31, by its engagement with the upper end of the port member, also serves to limit downward movement of the pusher-plate.

Threaded in an opening in a side wall of the valve casing is a cap member 35, the inner face of the head of which is preferably provided with an annular knife-edge portion 36 to insure a fluid-tight connection. Freely supported in the bore of the cap member is a cylindrical member or cartridge 37, the inner end portion of which is a free fit in a bore 38 communicating with the inlet chamber 12, this bore being reduced adjacent the inlet chamber to provide a shoulder 39. A relatively light spring 40, compressed between the cap member 35 and a shoulder formed in the outer end of the bore of member 37, urges the inner end of this member into fluid-tight engagement with the shoulder 39. The bore of member 37 is reduced at its inner end to form a restricted orifice 41, lateral openings 42 being provided in the member for connecting its bore with the main inlet valve passage 43, wherein is mounted a strainer 44.

With the valve in open condition, as shown, fluid can flow from the inlet 43 through openings 42, orifice 41, inlet chamber 12, port 23, openings 30, outlet chamber 13, and outlet passages 45 and 46. It will be seen that the pressure of the fluid in the bore of member 37 aids spring 40 in holding the end of the member in tight engagement with shoulder 39. Under some conditions spring 40 may be omitted, the member 37 then being held in position solely by the fluid pressure. If it is desired to change the flow capacity of the valve, the cap member 35 is unscrewed, it carrying with it the member 37. Another member or cartridge, having an orifice of different size, is then substituted in the cap member and the assembly remounted in the casing. It will be noted that, when the cap member is removed, if the cartridge still remains in the casing it is then readily accessible for removal since its outer end extends slightly beyond the surface of the casing.

While I have herein shown and described my invention as embodied in a specific form of refrigerant control valve, it is obviously also adapted for other fluid control purposes. I intend therefore, that the invention be limited only by the scope of the appended claim. This application is a continuation-in-part of my copending application Serial No. 367,321 filed November 27, 1940.

I claim as my invention:

In a fluid control valve: a casing having a valved passage therethrough, a portion of said passage being at an angle to an adjoining portion thereof, said casing also having a bore branched from said passage at the intersection of said portions and extending to the exterior of the casing, a cap closing the outer end of said bore and having a part extending therewithin, said part providing a cylindrical recess concentric with said bore, the bore being coaxial with one of said passage portions, an elongated cylindrical member freely receivable in the bore and having an end portion fitting within said recess of the cap, said member having at its other end a plane surface engageable with a plane shoulder formed at the end of said one passage portion at said intersection, said member providing a restricted opening through which the fluid controlled by the valve must pass when the member is in shoulder-engaging position, and a spring compressed between the cap and the member and urging the same into engagement with the shoulder.

HAROLD J. MATTESON.